United States Patent
Fong et al.

(10) Patent No.: US 12,475,764 B2
(45) Date of Patent: Nov. 18, 2025

(54) DUAL PLAYER LOYALTY ACCOUNT ACCESS AND CASH KIOSK AND METHOD OF USE

(71) Applicant: Everi Payments Inc., Austin, TX (US)

(72) Inventors: Adam Fong, Henderson, NV (US);
Sam Attisha, Las Vegas, NV (US);
Michelle Percival, Clarkston, MI (US);
Chris Micu, Las Vegas, NV (US);
Steve Nguyen, Santa Ana, CA (US);
Arun Jeyarajaguru, Madurai (IN)

(73) Assignee: Everi Payments Inc., Las Vegas, NV (US)

( * ) Notice: Subject to any disclaimer, the term of this patent is extended or adjusted under 35 U.S.C. 154(b) by 410 days.

(21) Appl. No.: 17/955,259

(22) Filed: Sep. 28, 2022

(65) Prior Publication Data
US 2023/0104941 A1    Apr. 6, 2023

Related U.S. Application Data

(60) Provisional application No. 63/251,199, filed on Oct. 1, 2021.

(51) Int. Cl.
*G07F 17/32*    (2006.01)

(52) U.S. Cl.
CPC ...... *G07F 17/3255* (2013.01); *G07F 17/3225* (2013.01)

(58) Field of Classification Search
CPC .......................... G07F 17/3255; G07F 17/3225
See application file for complete search history.

(56) References Cited

U.S. PATENT DOCUMENTS

| | | | | |
|---|---|---|---|---|
| 10,410,468 B1* | 9/2019 | Sanford | ............ | G07F 17/3244 |
| 10,706,684 B1* | 7/2020 | Sanford | ............ | G07F 17/3255 |
| 11,461,747 B1* | 10/2022 | Thomas | ............ | G06Q 20/40155 |
| 2004/0204233 A1* | 10/2004 | Saffari | ............ | G07F 17/32 463/25 |
| 2006/0073883 A1* | 4/2006 | Franks | ............ | G07F 17/3251 463/25 |
| 2007/0060286 A1* | 3/2007 | Sacks | ............ | G06Q 30/02 463/18 |
| 2009/0314840 A1* | 12/2009 | Granucci | ............ | G06K 19/07 235/492 |
| 2011/0231314 A1* | 9/2011 | Sears | ............ | G06Q 20/1085 705/43 |
| 2013/0226699 A1* | 8/2013 | Long | ............ | G06Q 30/01 705/27.1 |
| 2015/0126273 A1* | 5/2015 | Bjornebark | ............ | G07F 17/3255 463/25 |
| 2015/0170473 A1* | 6/2015 | Hematji | ............ | G06Q 20/4012 463/25 |

(Continued)

*Primary Examiner* — Carl V Larsen
(74) *Attorney, Agent, or Firm* — Snell & Wilmer LLP

(57) ABSTRACT

A dual-function kiosk enables cash access, such as from a banking system, via a cash access module, and enables player loyalty functionality, such as generating a player loyalty account, issuing a player loyalty card, or presenting player loyalty promotions or awards, via a player loyalty module. The different functionality may be selected by a user to a graphical user interface displayed by the kiosk. In addition, a system and method are provided for enabling cash access by a mobile communication device of a player, such as for dispensing at a kiosk.

7 Claims, 4 Drawing Sheets

(56) References Cited

U.S. PATENT DOCUMENTS

| | | | | |
|---|---|---|---|---|
| 2015/0243133 | A1* | 8/2015 | Nicholas | G07F 17/3206 |
| | | | | 463/25 |
| 2015/0339888 | A1* | 11/2015 | Hong | G07F 17/3251 |
| | | | | 463/25 |
| 2016/0321855 | A1* | 11/2016 | Jordan | G07F 17/323 |
| 2017/0011593 | A1* | 1/2017 | Palermo | G07F 17/3258 |
| 2018/0023955 | A1* | 1/2018 | Nelson | G07F 17/3211 |
| | | | | 701/469 |
| 2018/0308314 | A1* | 10/2018 | Sanford | G07F 17/3244 |
| 2018/0349902 | A1* | 12/2018 | Schwartz | G07F 19/203 |
| 2019/0340871 | A1* | 11/2019 | Miri | G07F 17/3227 |
| 2020/0349537 | A1* | 11/2020 | Schwartz | G07F 17/3251 |
| 2021/0326840 | A1* | 10/2021 | Hilal | G06Q 20/351 |
| 2021/0390828 | A1* | 12/2021 | Kubajak | G06Q 20/04 |
| 2022/0188919 | A1* | 6/2022 | Higgins | G06Q 40/03 |
| 2023/0067075 | A1* | 3/2023 | Shepherd | G07F 17/3225 |

* cited by examiner

DUAL PLAYER LOYALTY ACCOUNT ACCESS AND CASH KIOSK AND METHOD OF USE

RELATED APPLICATION DATA

This application claims priority to U.S. Provisional Application Ser. No. 63/251,199, filed Oct. 1, 2021, and incorporates said application by reference herein in its entirety.

FIELD OF THE INVENTION

The present invention relates to casino player loyalty systems and methods and devices for casino player cash access.

BACKGROUND OF THE INVENTION

Casino gaming has evolved tremendously over the last several decades. In the early days, players who visited casinos had to take cash with them to wager or had to obtain a casino marker—a form of 'on property' credit, to fund their wagering. As one way of addressing this problem, most casinos have placed ATMs on and around the gaming floor, allowing players to use their bank card to obtain cash directly at the casino.

Like other businesses, casino operators want to keep existing players and attract new players. For example, a casino may offer complementary drinks to its players in order to entice them to come to the casino and play games at the casino. In order to enhance player marketing efforts, most casinos operate a player loyalty system. These systems allow casinos to track the game play of individual players, such as by issuing a player card to the player that the player uses to identify themselves at a gaming machine. These systems allow casinos to obtain information about players and their game play, such as for determining complimentary awards or promotions to be awarded to players which are based upon actual metrics associated with each individual player's activities. The systems also allow casinos to send offers or promotions to players who have not visited the casino in a period of time.

Still, problems exist with these systems. For example, for a player to join a casino's loyalty program, the player may need to travel to a player loyalty club booth in the casino to sign up and to do things like obtain promotional prizes or awards. At the same time, the player may need to travel from a gaming machine to an ATM in order to obtain cash. These actions detract from the main goal of allowing a player to focus upon wagering activities at gaming tables, gaming machines and the like. Further, in some instances, a player may not have access to desired funds for gaming (such as by having met a daily ATM limit) and may desire an easier way to access casino credit that the existing process of seeking a casino marker.

SUMMARY OF THE INVENTION

Embodiments of the invention comprise systems and methods for unifying player loyalty account access and cash access, preferably via a dual-function kiosk. Additional embodiments of the invention comprise a system and method for cash access enabled via remote or mobile user devices.

One embodiment of the invention comprises a dual function kiosk configured to implement player loyalty and cash access functionality, comprising: a kiosk housing; at least one video display supported by the housing; at least one user input device supported by the housing; a currency dispensing device; a processor; a memory; at least one communication interface, the at least one communication interface in communication at one or more times with a casino player loyalty system and a banking system; machine-readable code stored in the memory and executable by the processor, the machine-readable code comprising a player loyalty module and a cash access module, the machine-readable code configured, when executed by the processor, to cause the processor to: cause the at least one video display to display a menu presenting an option of player loyalty functionality and another option of cash access functionality; receive input from a user of the kiosk via the at least one user input device, wherein; upon receipt of input to access the player loyalty functionality, execute the player loyalty module, the player loyalty module causing the processor to communicate with the casino player loyalty system to implement player loyalty functionality comprising at least one of creating a player loyalty account, dispensing a player loyalty card, present at least one player loyalty promotion and award at least one player loyalty promotional award; and upon receipt of input to access the cash access functionality, execute the cash access module, the cash access module causing the processor to process, via communication with the banking network, at least one cash access transaction associated with a player funds account.

Another embodiment of the invention comprises a method of providing a user with player loyalty and cash access functionality via a common kiosk, comprising the steps of: displaying, via a video display of the kiosk, a first option to select player loyalty functionality and a second option to select cash access functionality; receiving, from the player via a user input device of the kiosk either the first option or the second option; upon receiving input of the first option, executing, by a processor the kiosk, a player loyalty module, the player loyalty module causing the kiosk to communicate with a casino player loyalty system and implement player loyalty functionality comprising at least one of creating a player loyalty account, dispensing a player loyalty card, present at least one player loyalty promotion and award at least one player loyalty promotional award; and upon receiving input of the second option, executing, by the processor the kiosk, a cash access module, the cash access module causing the kiosk to communicate with a banking network and implement at least one cash access transaction associated with a player funds account.

Yet another embodiment of the invention comprises a method of providing cash access to a player via a kiosk, comprising the steps of: receiving, a server of a casino system, a request for cash access from a mobile communication device of the player, the request comprising first or second player identification information; utilizing, by the server, the first or second player identification information to generate a cash access limit; transmitting information regarding the cash access limit for display to the player at the mobile communication device; receiving, at the kiosk, a request to access an amount of cash from the cash access limit from the player; validating, by a request from the kiosk to the server, the amount of the cash against the cash access limit; and dispensing, from a currency dispenser of the kiosk, currency in the amount of the cash.

Further objects, features, and advantages of the present invention over the prior art will become apparent from the detailed description of the drawings which follows when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise systems, methods, and devices for integration of player loyalty account access and cash access, and namely "single device" player loyalty account and cash access in a casino environment.

Figure 1:
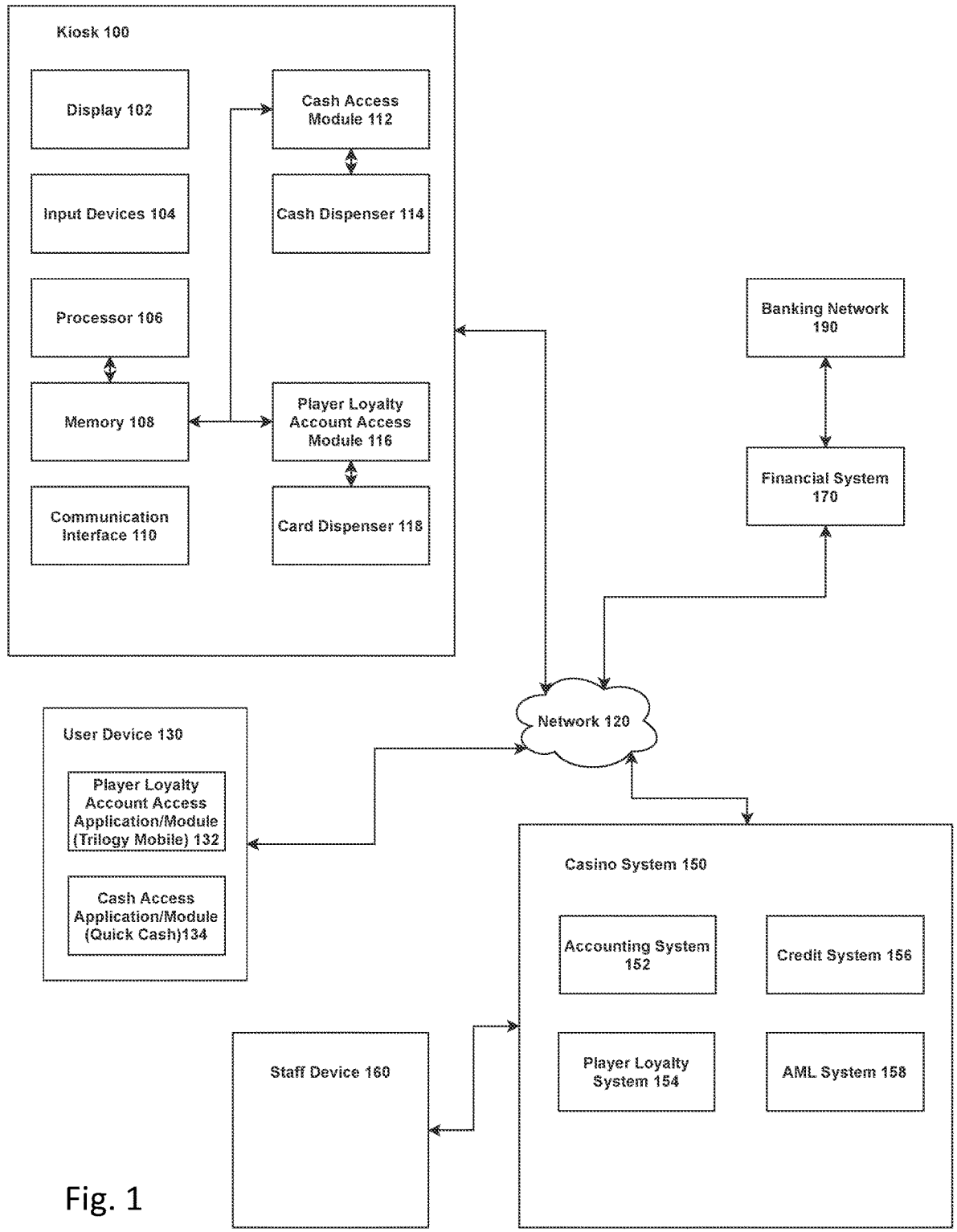
FIG. 1 illustrates one embodiment of a dual player loyalty account access and cash access kiosk system in an exemplary environment of use.

One embodiment of a system of the invention is illustrated in FIG. 1. A preferred embodiment of the integration of player loyalty account access and cash access is via a dual-function kiosk 100. The dual-function kiosk 100 may be in communication with one or more player devices 130, casino systems 150, and financial systems 170 via a network 120 (such as Internet, a casino LAN/WAN, etc.).

The kiosk 100 may comprise a housing or terminal with a display 102, one or more input devices 104 (such as a touch-screen, buttons, keypad or the like), a processor 106, a memory 108, software stored in the memory and executable by the processor, and one or more communication interfaces 110.

Importantly, the software may include a cash access module 112, which may be configured to process one or more cash access transactions (such as to access funds from a player's external bank account, wallet, or other sources (including casino credit) and/or to move funds to such an external account or the like). In some embodiments, the cash access transaction may cause the kiosk 100 to cause cash (or cash-equivalent, such as a monetary value gaming ticket) to be dispensed from a cash dispenser 114 (while the funds might be dispensed in currency format, as indicated they might be dispensed in the form of a ticket, or even electronically, such as by funds transfer to a casino account, casino wallet or the like).

The software may also preferably includes a player loyalty account access module 116, which may be configured to interface with a casino player loyalty system and to implement various player loyalty functions. These functions may include, but are not limited to: causing a player loyalty card to be dispensed from a card dispenser 118 to the player, presenting one or more promotional events, viewing or presenting promotional awards points balances or other loyalty account information, and awarding and/or redeeming one or more promotional awards.

The dual-function kiosk 100 may be part of a kiosk system, which may include at least one kiosk server (not shown), such as a transactional server or interface, and which may comprise one or more processors or controllers, at least one communication device or interface, a database or other data storage device, and one or more additional memory or data storage devices (such as separate from the database). In one or more embodiments, the processor(s) is configured to execute one or more instructions, such as in the form of machine readable code (i.e. "software"), to allow the kiosk server to perform various functions. The software is preferably non-transitory, such as by being fixed in a tangible medium. For example, the software may be stored in the one or more memory devices. One or more of the memory devices may be read-only. In addition, the software may be stored on a removable medium in some embodiments. In general, the one or more memory devices are used as temporary storage. For example, the one or more memory devices may be random access memory or cache memory used to temporarily store some user information and/or instructions for execution by the at least one processor.

The software may comprise one or more modules or blocks of machine-readable code. Each module may be configured to implement particular functionality when executed by the one or more processors, and the various modules may work together to provide overall integrated functionality. Of course, in certain embodiments, it is also possible for various of the functionality to be implemented as hardware, i.e. a processor or chip which is particularly designed to implement various of the functionality described herein.

In one embodiment, the kiosk server may include (or be linked communicatively at one or more times to) one or more input and/or output devices, such as a keyboard, mouse, touchscreen, video display or the like, whereby the processor may receive information from an operator or servicer of the kiosk server and/or output information thereto. This allows, for example, an operator of the kiosk server to interface with the server to upgrade, maintain, monitor, etc. In other embodiments, an operator might interface with the kiosk server via a separate workstation or other devices.

In one embodiment, the processor and other elements of the kiosk server may be linked and thus communicate over one or more communication buses. In this manner, for example, the processor may read/receive software from the memory for execution, receive inputs and provide outputs to the various I/O devices, receive information from or output information to external devices via the communication interface, etc.

The one or more casino systems 150 may include similar features (such as servers) as the kiosk system described above. The one or more casino systems 150 may include (but do not have to include, and may include additional systems or devices): an accounting system 152, a player loyalty system 154, a credit system 156, and an AML system 158. The casino system 150 may also include one or more staff devices 160 (such as workstations, computers, smart phones, tablets, or other user electronic or computing devices). Communication interfaces and/or software applications may be used to facilitate communication between the one or more casino systems 150 and the one or more staff devices 160. It will be appreciated that the one or more casino systems 150 may be separate system, interconnected systems and/or integrated systems, including where the systems utilize separate, connected or common elements. Further, the one or more casino systems 150 may be operated by the casino and/or third parties and may have components physically located at the casino or remote therefrom.

As one example, the casino accounting system 154 may implement accounting functionality, which may include tracking of wagers made, winnings awarded/paid and amounts lost at the gaming devices at the casino (gaming machines, tables, etc.), amounts associated with monetary value tickets issued and redeemed, etc. In this regard, the casino system 150 may include other elements. For example, the casino might operate one or more cashier cages. These cages may be used to implement various functionality, such as allowing players to cash chips for currency, allowing players to cash checks for chips, allowing players to associate funds (such as from a credit card, bank account, or the like) with a wagering account, such as a sports wagering account, casino wagering account or the like. The accounting functionality may thus include tracking the amounts of casino chips issued and redeemed, checks cashed, etc. The cashier cage may include a cashier workstation, a monetary value dispensing mechanism, and other elements.

The casino player loyalty system 154 may implement player tracking and rewards functionality, such as by generating and maintaining player accounts for individual players, tracking wagering and other activities of the players, and issuing awards to players based upon their activities, such as points or the like, awarding promotional awards, presenting promotions events (including promotional games), etc.

The credit system 156 may implement credit functionality, such as to accept credit applications for players, determine player credit-worthiness of players, generate credit lines for players, track amounts of credits issued to players, have the ability to link/connect aggregate bank accounts/data for payment processing, and implement collection efforts for unpaid amounts.

The AML system 158 may implement anti-money laundering functionality, such as to retrieve player information with respect to previously-reported suspicious activities, and to report new suspicious activities, generate and transmit financial transaction reports and the like.

The dual-function kiosk 100 may communicate with a financial system 170 to further facilitate the services described above. The financial system 170 may include, for example, one or more transaction servers for processing transactions forwarded by the kiosk 100, such as by communicating with external banks/banking networks 190. In some embodiments, aspects of the AML system 158 and the like may be integrated with the financial 170.

The dual-function kiosk 100 may be in communication with the one or more casino systems 150 to provide the services described above, or other services. For example, players may access cash via the cash access module 112, which may communicate with the financial system 170 to process a cash access transaction of funds from a player's banking account.

In one embodiment, players may also access the one or more of the services described above remotely, such as via a user device 130 (such as a computing workstation, smart phones/PDA, tablet, or other user electronic or computing device). A player loyalty account access software application 132 operating on the user device 130 may allow a player to communicate with the player loyalty system 154, which may, in turn, allow a player to register an account, view/update account information, and to track player rewards. A cash access software application 134 may allow a player to communicate with the accounting system 152 and/or the credit system 156, which may, in turn, allow a player to obtain cash and/or to apply for markers and/or lines of credit. Further, as described below, in some embodiments, transactions may be initiated or staged at the user's device 130, but be completed at the dual-function kiosk 100. In one embodiment, a software application (such as a downloadable mobile application) may integrate the player loyalty account access software application 132 and the cash access software application 134 as software modules to a single software application.

Figure 2:
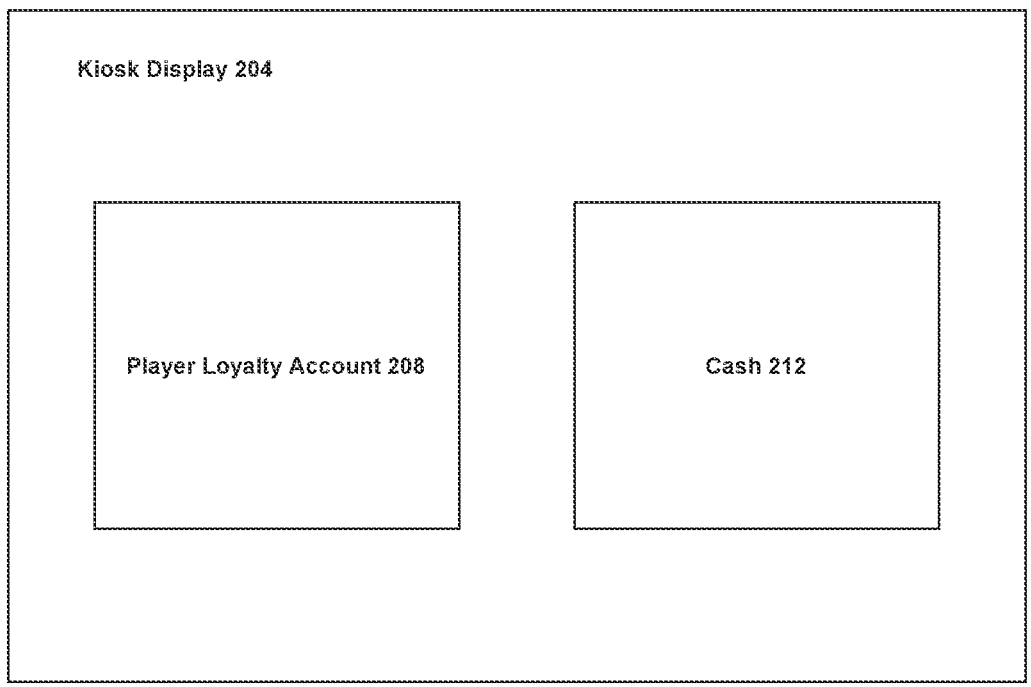
FIG. 2 illustrates an exemplary user interface that may be displayed by a kiosk of the invention.

FIG. 2 illustrates an exemplary user interface that may be displayed by the dual-function kiosk 100 of the invention. This interface might comprise a main or home screen, or might be accessible from other screens or interfaces. In one embodiment, this screen provides an interface which allows a player to access the player loyalty account access software application or module 132 or the cash access application or module 134. For example, a main interface 204 may display a first element 208, such as a button or box, which when selected (such as by a touch screen or other input) effectuates implementation of the player loyalty account access software application 132, and a second element 212, such as another button or box, which when selected, effectuates implementation of the cash access software application 134.

Upon selecting the cash access option, cash access functionality may be implemented. In one embodiment, this may comprise the further display of one or more cash access options to the player and implementation of a selected option. As indicated above, for example, such options may comprise seeking cash (monetary value), such as from a bank account via a banking network. Such a transaction might comprise an ATM or POS type transaction in which cash is access from a player's bank account using a bank card, such as a credit or debit card. The options might also comprise obtaining or moving funds to or from a wallet, or seeking cash via a credit line or marker. Of course, other cash access options may be presented. As indicated, in some embodiments, implementation of a cash access transaction may involve dispensing currency (and/or coins) from the kiosk, issuance of ticket or voucher having associated monetary value, issuance of a media having associated credits, or transfer or monetary value to or from an account—such as from a bank account to a player's casino wallet.

Upon selecting the player loyalty option, player loyalty functionality may be implemented. In one embodiment, this may comprise the further display of one or more player loyalty options to the player and implementation of a selected option. As indicated above, such options might comprise, but are not limited to: setting up a player loyalty account, issuing a player loyalty card, presenting a player loyalty promotion and issuing a player loyalty reward or award.

In this manner, the kiosk 100 may be dual-function in that it enables a player to select and implement or access player loyalty system functionality, as well as select and implement or access cash access functionality (such as facilitated by the connection of the kiosk 100 with the financial system 170 via the cash access software application 134, and by connection of the kiosk 100 to the player loyalty system 154, such as via the player loyalty account access software application 132). In this manner, a player may now conveniently travel to a single device (such as the dual-function kiosk 100) to engage in either cash access or player loyalty functionality.

While in one embodiment the dual-function kiosk 100 includes both a cash access software application 134 as one module and a player loyalty account access software application 132 as another module, in some embodiments, these applications might be merged, such as into a single application or module.

As another aspect of the invention, in some embodiments, certain transactions may be initiated, such as staged, via a user device 130, and the completed at different location. In one embodiment, the different or second location is a dual-function kiosk 100 of the invention (although it might comprise other types of kiosks, ATMs or other devices). In one embodiment, a player may request credit, and preferably casino-credit, via their user device 130, and then obtain funds based upon granted credit, such as in the form of cash or ticket which is issued by the dual-function kiosk 100.

Figure 3:
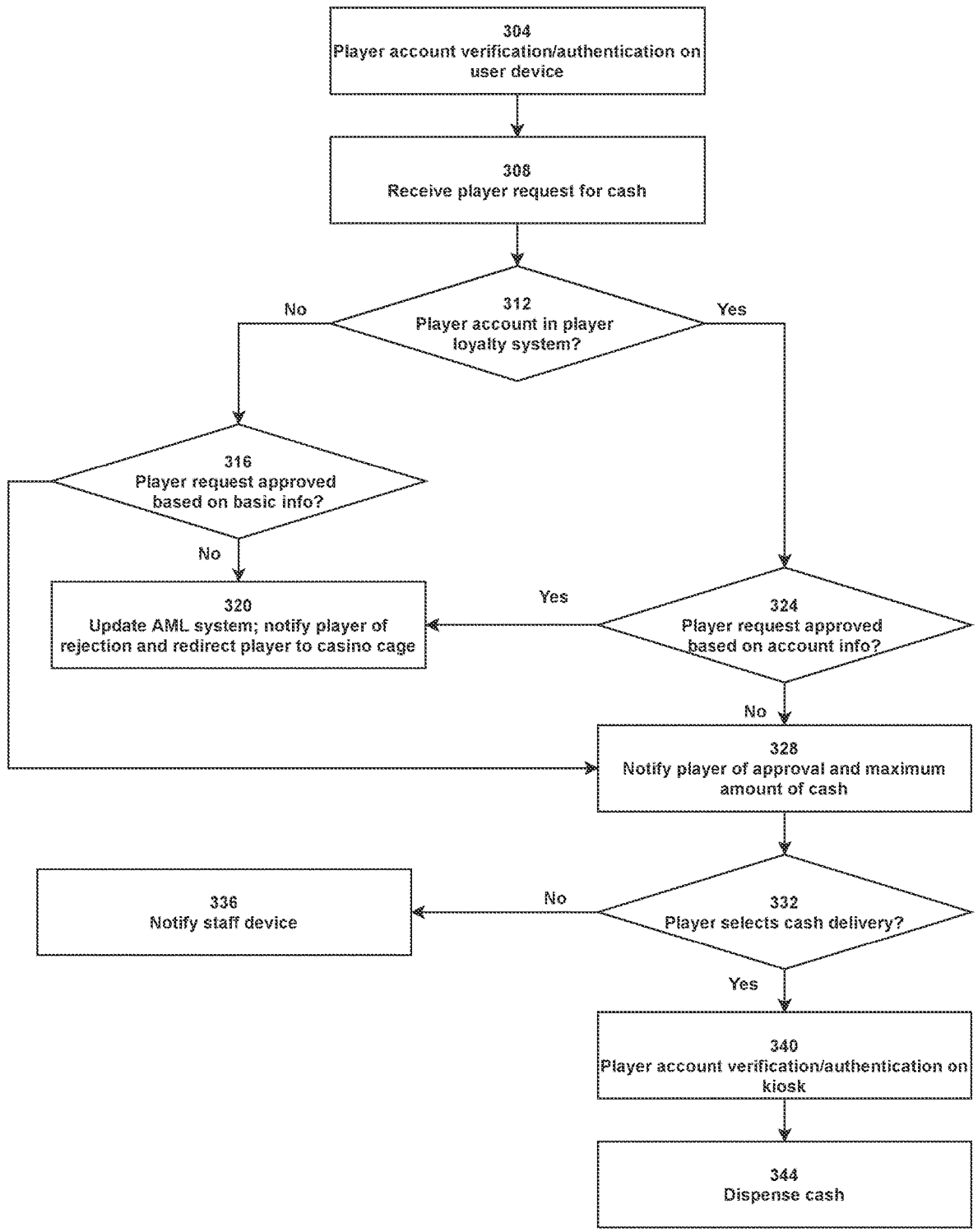
FIG. 3 is a flowchart of one exemplary lifecycle of a remote cash request.

FIG. 3 is a flowchart of one exemplary lifecycle of a remote credit or cash request. A player may be at a casino table, at a home or office (or in route) with plans to visit a casino, and may be in need of cash, such as for wagering purposes. Conventionally, casinos may provide casino credit following a lengthy and complex approval procedure, which may involve a player filling out a credit form, an then an extensive background and/or credit check on the player. Generally, the result of this process, if the player is approved, is the issuance of a casino marker—a negotiable instrument which the player signs and which the player can then redeem for cash, gaming chips or the like, for use in wagering at the casino (and which the player must pay back).

In a step 304, a player may initiate a credit request via the cash access module 134 running on a user device 130. Where the player already has a player loyalty account, the cash access module 134 may be linked to the player's loyalty account information or information from that account may be obtained on the back-end (such as via communication from the credit system 156 with the player loyalty system 154). Otherwise, the player may be prompted to provide basic information to permit a simplified credit check, based on the requirements of the credit system 156. In one embodiment, where the player does not have an existing loyalty account, they may be prompted to create such an account and to provide the necessary account information.

In a step 308, the player may request cash (in the form of credit). In one embodiment, the player may input a generic request without a specified amount. In another embodiment, the player may pre-select the desired amount.

In a step 312, it is determined whether a player has an existing account in the player loyalty system (or just created one as described in step 304). If not, then in a step 316, the cash request may be processed based on the basic information the player provided in step 304. Such processing may include a simplified background and/or credit check, and any other additional requirements from the credit system 156. If the cash request is not approved, then in a step 320, the player may receive notification via the user device 130 that the cash request is not approved, and the player may be directed to a casino cage for a more comprehensive background and/or credit check to determine whether cash may be provided to the player. Simultaneously, the AML system 158 may be updated to reflect the rejection, which may be used for future cash requests and player loyalty account creation. Where applicable, the AML system 158 may also initiate reporting procedures.

If, on the other hand, the cash request is approved based on the basic information provided by the player, then in a step 328, the player may receive notification of the approval via the user device 130. The maximum amount of cash approved may be depend on the processing of the basic information provided by the player. In one embodiment, the amount of cash/credit approved may depend on the player's credit score. The player may receive notification of the maximum amount of cash approved. Where the player specified a desired amount in step 308, and the desired amount is higher than the maximum amount of cash approved, the player may be redirected to the casino cage for further approval of the deficiency.

If, in step 312, the cash request is associated with a player account in the player loyalty system, then in a step 324, information in the player loyalty account may be used to process the cash request. Such information may include but are not limited to the player's government-issued identification documents, player properties and financial accounts, and information generated by validations performed on the player loyalty account such as tax identification number checks, Office of Foreign Asset Control checks, etc. Upon such processing, if the cash request is rejected, then step 320 may follow. If, on the other hand, the cash request is accepted, then step 328 may follow.

In a step 332, if the player did not previously specify a desired cash amount, the player may specify the amount, which may be any number below the maximum amount of cash approved.

In certain examples, the amount of credit (and thus cash) which is offered to a player may be based upon the amount of information that the player provides and/or the level of background due diligence performed. For example, a first level of credit might be provided based solely upon just a credit score obtained for the player (such as from an external credit reporting agency). The first level of credit might be defined by a matrix of amounts in relation to credit score, where higher credit scores result in offers of higher credit amounts and lower scores with lower credit amounts. A second level of credit might be provided based upon a credit score and additional information, such as a verified bank account balance, information regarding owned property or the like. Other information a player may provide, and/or a casino may have on-file, include but are not limited to patron relationships at the casino (i.e. tenure, play action, etc.), central credit gaming history, or source of income (i.e. employment, investment assets, etc.). Again, a matrix of credit vs. creditworthiness may be utilized as a "look-up" of an amount of credit to be offered to the player. In some embodiments, the player may be permitted to select the credit which they wish to seek, such as based upon the amount of information that they provide or the amount of background investigation they consent to.

An approval of requested cash, such as reflected by a cash access limit, may be stored, such as at the credit system 156. The approval may be stored in association with player identification information or may be stored as a record, such as in association with a transaction code.

If approved, the player may also be presented with an option for cash delivery, which may be useful for players sitting at a gaming table or gaming device who do not wish to interrupt their wagering gameplay. If the player elects cash delivery, then in a step 336, a casino staff or attendant may be notified to deliver the requested amount of cash. In a preferred embodiment, the notification may occur on a staff device 160.

In a preferred embodiment, however, the player may obtain the cash (in currency or ticket format, for example) from one of the dual-function kiosks 100. In one embodiment, a player may travel to a dual-function kiosk 100 and initiate the cash access functionality. The player may elect to complete an existing transaction. The player may be provided with a code, such as displayed on their user device 130 which they can input to the kiosk 100 in order to link the transaction initiated at their user device 130 with the kiosk, or they might sync their user device 130 with the kiosk 100 (such as via a validation or verification process which links their device to the kiosk directly or indirectly, such as via a remote communication path via the financial system 170, credit system 156 or the like). In one embodiment, a player may have an option to apply for credit and/or increase the credit limit from the credit system 156. This option may be provided via the kiosk 100 or user devices 130. In one embodiment, the kiosk 100 may contain a button icon to represent a trigger to send a link to the player's user device (such as smartphone) and/or player portal to 'apply for credit' or 'increase limit' from Credit System 156.

Once the transaction is linked, it may be completed at the kiosk 100 by the kiosk 100 issuing currency, a monetary value gaming ticket or the like, to the player in the amount of the requested/approved cash/credit.

Figure 4:
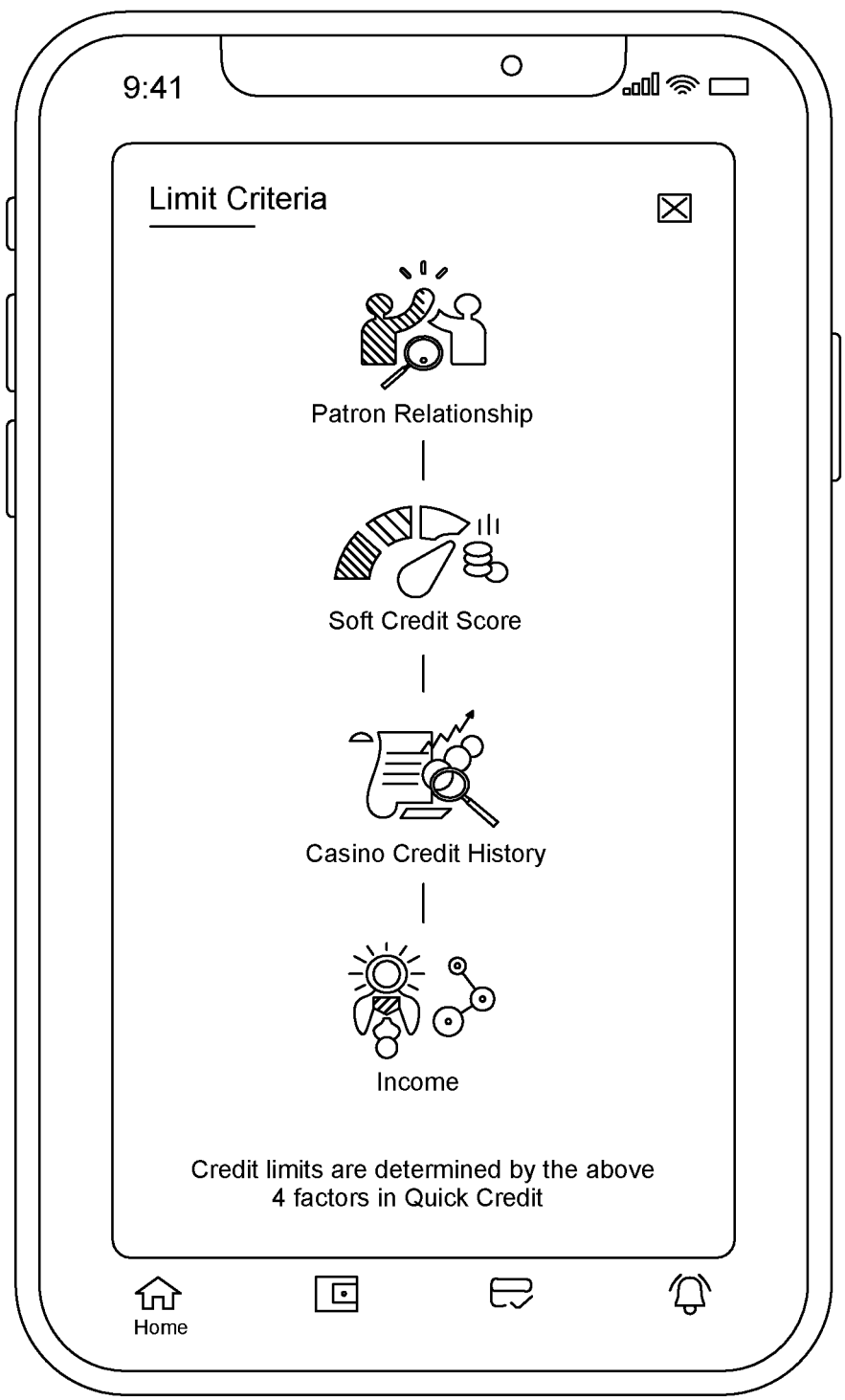
FIG. 4 is an exemplary user interface of the one or more factors used to determine credit and/or credit limits for a player.

FIG. 4 is an exemplary user interface of the one or more factors used to determine credit and/or credit limits for a player. As discussed above, a second level of credit might be provided to a player based upon a credit score and additional information such as patron relationships at the casino (i.e. tenure, play action, etc.), the player's credit score, central credit gaming history, and/or the player's source of income (i.e. employment, investment assets, etc.).

The system and method of this invention present an advantage over conventional casino systems, where player loyalty systems and cash access are implemented by separate systems and are accessed by separate devices (such as an ATM and a loyalty booth). Further, a player may also apply for credit via mobile or other device, including remotely from the casino, and then conveniently obtain cash at a kiosk or similar device at the casino.

What is claimed is:

1. A method of providing cash access to a player via a kiosk, comprising the steps of:
   receiving, at a server of a casino system, a request for cash access from a mobile communication device of said player, said request comprising player identification information;
   determining a cash access limit at said server, wherein when said player identification information identifies a loyalty account belonging to said player, said server utilizes information associated with said loyalty account to generate said cash access limit in a first amount, when said player identification does not identify a loyalty account belonging to said player, said server utilizes information associated with said player identification information to generate said cash access limit in a second amount;
   transmitting information regarding said cash access limit for display to said player at said mobile communication device and an access code;
   receiving, at said kiosk, said access code and a request to access an amount of cash from said cash access limit from said player;
   validating, by a request from said kiosk to said server, said amount of said cash against said cash access limit; and
   dispensing, from a currency dispenser of said kiosk, currency in the amount of said cash.

2. The method in accordance with claim 1, wherein said player identification information comprises at least one of player loyalty account information and player identity information.

3. The method in accordance with claim 2, wherein said first amount and said second amount of said cash access limit are different.

4. The method in accordance with claim 2, further comprising performing a credit worthiness check on said player based upon said player identity information.

5. The method in accordance with claim 2, wherein the second amount varies depending upon the amount of player identity information provided by said player.

6. The method in accordance with claim 2, wherein when the player identification information does not identify a player loyalty account, generating a player loyalty account utilizing said player identity information.

7. The method in accordance with claim 1, wherein said step of receiving said request to access an amount of cash comprises placing said mobile communication device of said player in communication with said kiosk.

* * * * *